Oct. 5, 1937.    F. H. RYLANDER    2,095,084
NAVIGATIONAL AID
Filed June 2, 1937    2 Sheets-Sheet 1
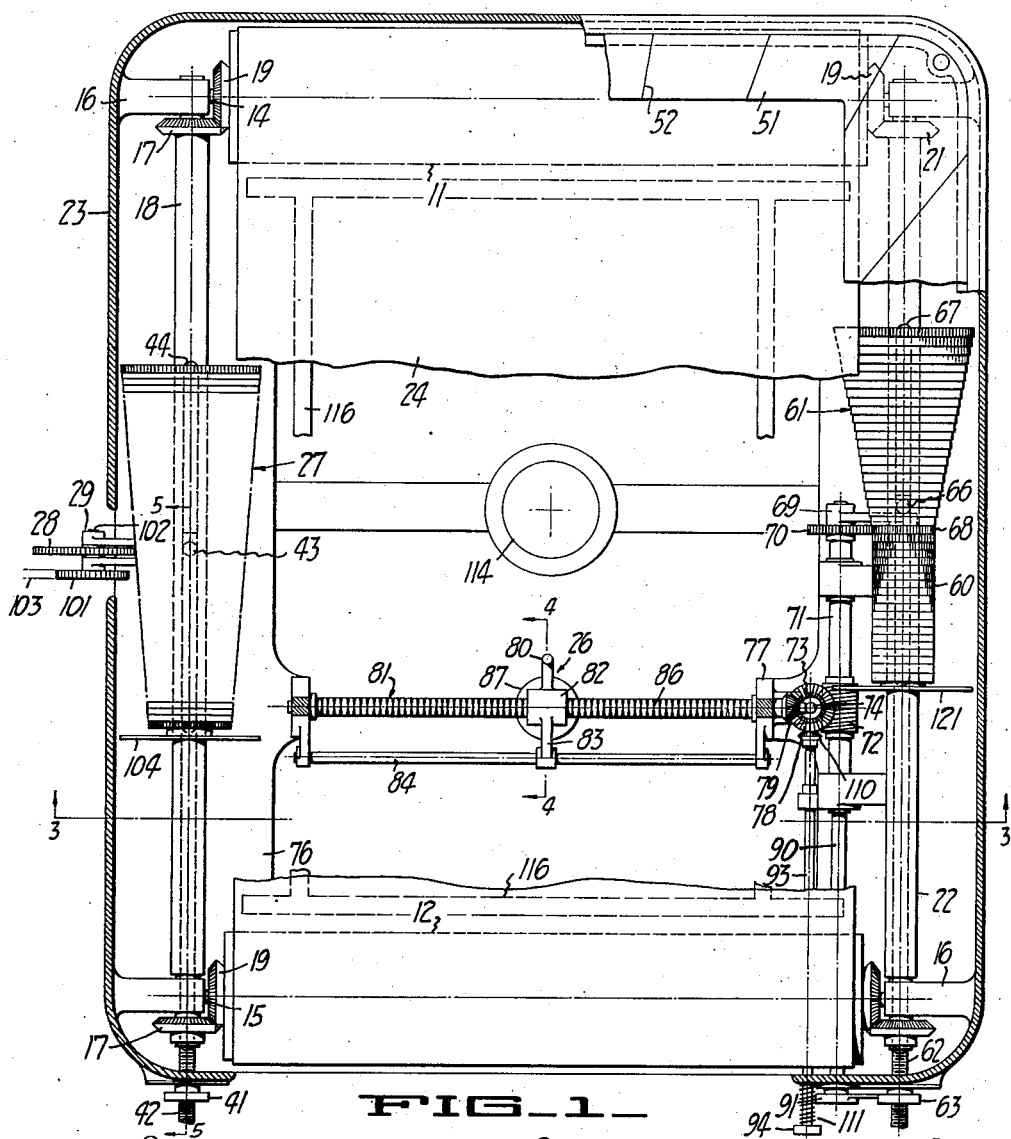
FIG_1_
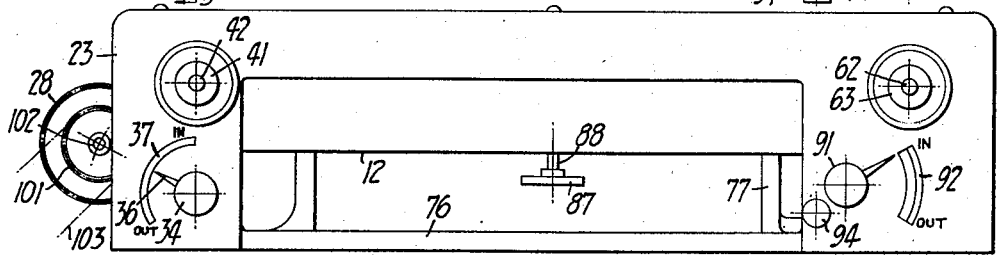
FIG_2_
INVENTOR.
Fred H. Rylander
BY Robert H. Eckloff
ATTORNEY.

Oct. 5, 1937.  F. H. RYLANDER  2,095,084
NAVIGATIONAL AID
Filed June 2, 1937  2 Sheets-Sheet 2
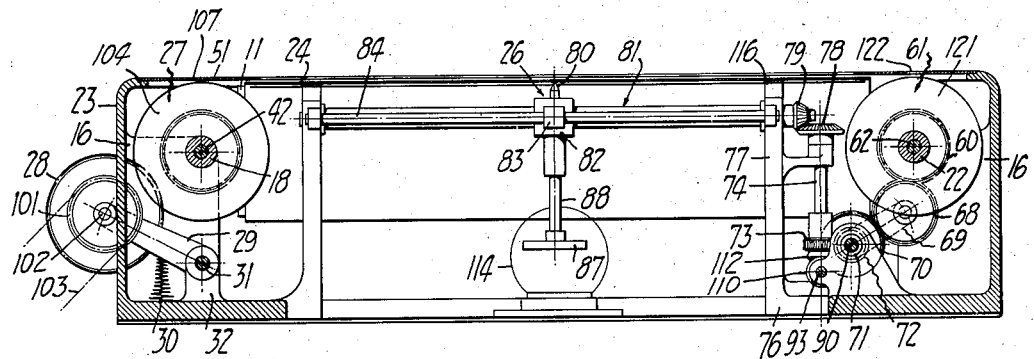
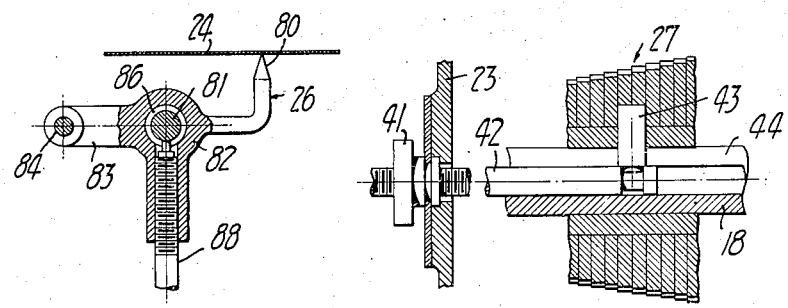
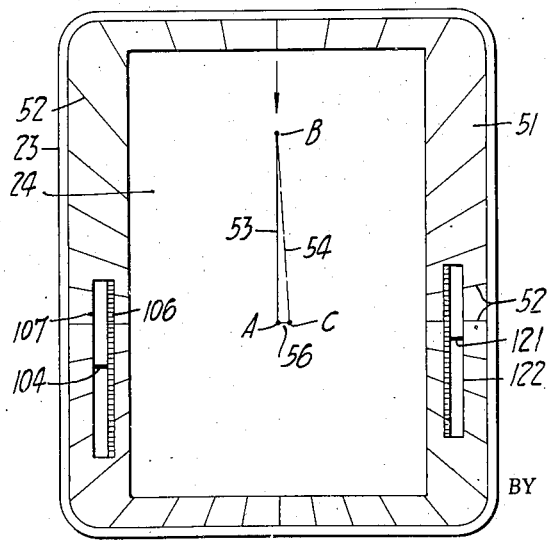
INVENTOR.
Fred H. Rylander
BY Robert H. Eckhoff
ATTORNEY.

Patented Oct. 5, 1937

2,095,084

UNITED STATES PATENT OFFICE 2,095,084

NAVIGATIONAL AID

Fred H. Rylander, San Francisco, Calif., assignor of one-half to Leo Dallin, Oakland, Calif.

Application June 2, 1937, Serial No. 145,988

4 Claims. (Cl. 40—42)

This invention relates to an improvement in navigational aids. The invention contemplates provision of an apparatus providing a ready representation of the movement of a dirigible vehicle toward a chosen destination. The aid of the present invention is useful in the navigation of any dirigible vehicle, particularly aircraft. The term vehicle is used in a broad sense as including those travelling on land and sea and in the air.

It is in general the broad object of the present invention to provide a simple navigation aid which indicates at all times the approximate position of the vehicle.

Another object of the present invention is to provide a suitable mechanical structure for use with a suitable chart to the end that a simple, rugged and inexpensive navigation aid is made available.

The invention includes other objects and features of advantage, some of which, together with the foregoing, will appear hereinafter wherein the present preferred form of navigation aid of this invention is disclosed.

In the drawings, Figure 1 is a plan view, partly in section, showing the apparatus.

Figure 2 is an end elevation of the apparatus.

Figure 3 is a section taken along the line 3—3 of Figure 1.

Figure 4 is a section taken along the line 4—4 of Figure 1.

Figure 5 is a section taken along the line 5—5 of Figure 1.

Figure 6 is a plan view, illustrating the utility of the present apparatus.

As is disclosed in the drawings, I provide a pair of opposite rollers 11 and 12. These are respectively supported upon suitable shafts 14 and 15 carried in journals 16 on casing 23. The rollers are inter-connected by bevel gears 17 and 21 carried upon hollow shafts 18 and 22, the roller shafts 14 and 15 carrying bevel gears 19. Shafts 18 and 22 are upon opposite sides of the casing structure 23 which surrounds the apparatus and provides a suitable enclosure therefor.

A chart indicated generally at 24 is wound upon roller 11 and is normally advanced from the top of Figure 1 to the bottom thereof, that is, the chart is unwound from roller 11 and wound upon roller 12. A support plate 116 is positioned beneath the chart to support it.

The chart 24 is drawn to a predetermined scale. Since the speed of the vehicle will vary between wide limits, I provide means for coordinating the speed with the direction of advance of the chart over position indicating means indicated by numeral 26 and to be discussed in detail hereinafter. The coordinating means comprises a gear body indicated by numeral 27. This gear body, slidably mounted upon hollow shaft 18, includes a plurality of separate gears, each gear having a different number of teeth.

A driving means, provided by a sprocket 101 on a shaft 102 carrying a gear 28, is supported in an oscillatable spring pressed support frame 29 which is positioned at the side of the casing 23. The sprocket 101 is driven by a chain 103. This driving means is merely typical of a suitable power input means. Sprocket 101 is driven at a speed approximating that of the vehicle. It can be driven by an element on the vehicle prime mover or by a separate power source.

The support frame 29 comprises a pair of parallel arms carried upon a shaft 31. Shaft 31 is supported in a bracket 32 and in the end frame of the casing. An operating member 34 is provided exteriorly of the casing, usually in the form of a knob having a pointer 36 which cooperates with an indicator 37, to show the position of the driving means relative to the gear body.

The gear body 27 is moved relative to the gear 28 to effect a change in the rate of movement of the chart and to coordinate it with the vehicle movement. The operating knob 34 is turned to the left in Figure 2, or counter-clockwise to release gear 28 from engagement, compressing the spring 30. The rotation of knob 41 on screw-threaded shaft 42 is effective to move the shaft 42 within the hollow shaft 18 and thus change the position of pin 43 which is carried by the gear body through slot 44 in the hollow shaft 18. When the position of the gear body has been changed to an extent desired, knob 34 is released. Upon the return of gear 28 to mesh with the gear body 27, the chart advances at a rate coordinated with the rate of forward travel of the vehicle. The coordinated speed is indicated by dial 104 as correlated with a cooperating miles per hour scale 106. Dial 104 is carried by the gear body while the scale is provided along the side of an aperture 107 in the frame 51 (Figure 6).

The casing 23 includes a top frame indicated generally by numeral 51 and removable therefrom to permit ready access to the chart so it can be changed. This frame is marked off in degrees, as indicated at 52, so that the navigator can utilize them in picking up, establishing and checking a course or position in the usual manner.

With the chart advancing in the direction indicated by the arrow in Figure 6, so long as the vehicle is on a straight line course, for example, from point A to point B, it is a simple matter and mere movement of the chart in the direction of the arrow suffices to indicate the position of the vehicle at any time upon the chart, so long as the rate of movement of the chart is coordinated with the speed of the vehicle. In other words, the rate of movement of the chart is such that it represents the actual speed of the vehicle reduced by the scale of the chart. For example, if the vehicle is traveling at 60 miles an hour, and if the scale of the chart is an inch to the mile, then the chart only moves linearly 1/60th as fast as the vehicle. When the course is not a straight line upon the chart, for example, if a navigator wishes to go from point C on the chart to point B, a course indicated by the line 54 is laid out. This course can be otherwise represented by line 56 and line 53. As the straight line is the shortest distance between two points, the course indicated by line 54 is followed instead of a course from C to A and from A to B, over lines indicated by 56 and 53. Under these circumstances, in accordance with this invention I provide means for imparting a transverse movement to the indicating means 26, and this movement can be either to the right or left in Figure 1. This moving means includes a gear body indicated at 61 and slidable upon the hollow shaft 22 to a desired extent by means of shaft 62 and knob 63 coordinating with the threaded end of the shaft 62. Gear body 61, like gear body 27, is made up of a plurality of gears, each one of increasing diameter, the increase being sufficient to the addition of one or more gear teeth. Gear body 61, however, unlike gear body 27, includes a portion 60 made up of a plurality of different gear segments or partial gears. That is, the first segment in the body has but a single tooth while the next segment has two teeth, the number increasing along the body. The segments are of the same diameter.

A pin 66 engages the gear body 61 through slot 67 in the hollow shaft 22, which enables the gear body to be moved to any desired extent. Selectively engageable with the gear body 61 is a driven gear 68 carried upon arm 69 and meshed with gear 70 upon a sleeve 71. Sleeve 71 carries a worm 72 which drives another worm 73. Worm 73 is mounted upon a shaft 74 carried upon the base structure 76 of the casing and extension 77 thereof. Bevel gear 78 is mounted upon the end of shaft 74 and is engaged with a bevel gear 79 carried upon drive shaft 81 for the position indicating means 26.

The position indicating means 26 includes a pointer 80 extending upwardly from a clutch body 82. While only a pointer has been shown, this can also be a chart marking element. An extension 83 is provided upon the clutch body, this extension being slidable over a rod 84. The shaft 81 carries a usual form of double thread indicated at 86 with which the clutch in clutch body 82 can be engaged selectively to advance indicating means 26 from right to left or from left to right by manipulating the clutch with the control knob 87 on shaft 88 extending to the clutch.

The selective transverse movement of the indicating means 26 is secured by manipulating a shaft 90, carried within sleeve 71, with knob 91. This cooperates with indicator 92 to indicate the position of the driving means for gear body 61. Knob 91 includes a detent, not shown, permitting the knob to be held in either the "in" or the "out" position, depending on whether or not transverse movement of the indicator is desired. Rod 93 carrying knob 94 and bevel gear 110 enables the shaft 81 to be rotated manually to adjust rapidly the transverse position of the indicating means to a desired point. A spring 111 normally holds gear 110 from engaging gear 112 on shaft 74. If manual adjustment is desired, the operator pushes knob 94 to engage gears 110 and 112 and then turns the knob to right or left.

The rate of transverse movement is indicated by disc 121 carried by gear body 61. This disc is visible through an aperture 122 in the frame 51, the side of the aperture being calibrated to indicate a suitable transverse rate, as miles per hour or degrees if a course angle is to be used.

Usually sufficient light enters through the open base of the case to show the indicating means in shadow upon the chart, the chart and indicating means being relatively close as indicated in Figure 4, so that the indicating means appears clearly upon the chart without marking or otherwise defacing the chart. In this manner, by suitably adjusting the controls and the relative rates of advance of the chart relative to the indicating means and of the indicating means relative to the chart, the vehicle navigator can readily ascertain visually his position, assuming of course that the forward rate of speed and the course are known. A light source 114 for use at night or at other times is provided beneath the chart.

I claim:

1. In a navigational aid for use on a dirigible vehicle, a pair of opposite spaced parallel rollers, providing support for a chart extended therebetween, means for selectively rotating said rollers at rate coordinated with that of said vehicle and the scale of said chart, a position indicating means including a shaft for rotating said rollers, a plurality of gears on said shaft, each of said gears having a different number of teeth, and a driven member selectively engageable with any one of said gears, and means for selectively moving said position indicating means transverse to the direction of advance of said chart and at a rate coordinated with deviation of said vehicle from a straight line course on said chart.

2. In a navigational aid for use on a dirigible vehicle, a pair of opposite spaced parallel rollers providing support for a chart extended therebetween, means for selectively rotating said rollers at rate coordinated with that of said vehicle and the scale of said chart, a position indicating means, and means for selectively moving said position indicating means transverse to the direction of advance of said chart and at a rate coordinated with deviation of said vehicle from a straight line course on said chart, including a shaft driven at a speed coordinated with that of said plane, a plurality of gears on said driven shaft, each of said gears having a different number of teeth, driven means selectively engageable with any one of said gears, a shaft for supporting said position indicating means, said supporting shaft being driven by said driven means, and a clutch between said position indicating means and said supporting means to control movement of said position indicating means.

3. In a navigational aid for use on a dirigible vehicle, a pair of opposite spaced parallel rollers, providing support for a chart extended therebetween, means for selectively rotating said rollers at rate coordinated with that of said vehicle and the scale of said chart, a position indicating means including a shaft for rotating said rollers, a plurality of gears on said shaft, each of said gears having a different number of teeth, and a driven member selectively engageable with any one of said gears, and means for selectively moving said position indicating means transverse to the direction of advance of said chart and at a rate coordinated with deviation of said vehicle from a straight line course on said chart, including a shaft driven at a speed coordinated with that of said plane, a plurality of gears on said driven shaft, each of said gears having a different number of teeth, driven means selectively engageable with any one of said gears, a shaft for supporting said position indicating means, said supporting shaft being driven by said driven means, and a clutch between said position indicating means and said supporting means to control movement of said position indicating means.

4. In a navigational aid for use on a dirigible vehicle, a pair of opposite spaced parallel rollers, providing support for a chart extended therebetween, means for selectively rotating said rollers at rate coordinated with that of said vehicle and the scale of said chart, a position indicating means including a shaft for rotating said rollers, a plurality of gears slidable as a body on said shaft, each of said gears having a different number of teeth, means extending within the gear supporting shaft to said gears as a body, and a driven member selectively engageable with any one of said gears, and means for selectively moving said position indicating means transverse to the direction of advance of said chart and at a rate coordinated with deviation of said vehicle from a straight line course on said chart, including a shaft driven at a speed coordinated with that of said plane, a plurality of gears slidable as a body on said driven shaft, each of said gears having a different number of teeth, means extending within the gear supporting shaft to said gears as a body, driven means selectively engageable with any one of said gears, a shaft for supporting said position indicating means, said supporting shaft being driven by said driven means, and a clutch between said position indicating means and said supporting means to control movement of said position indicating means.

FRED H. RYLANDER.